Feb. 8, 1966 L. SARATI ET AL 3,234,515

INFORMATION TRANSMISSION SYSTEMS HAVING REMOTE-CONTROL STATIONS OF THE REQUEST TYPE

Filed Aug. 6, 1962 2 Sheets-Sheet 1

INVENTORS
LUIGI SARATI
MADDALENA CABOARA

BY Irvin S. Thompson
ATTORNEY

Feb. 8, 1966    L. SARATI ET AL    3,234,515

INFORMATION TRANSMISSION SYSTEMS HAVING REMOTE-CONTROL STATIONS OF THE REQUEST TYPE

Filed Aug. 6, 1962    2 Sheets-Sheet 2

INVENTORS
LUIGI SARATI
MADDALENA CABOARA
BY Irwin S. Thompson
ATTORNEY

United States Patent Office 3,234,515
Patented Feb. 8, 1966

3,234,515
INFORMATION TRANSMISSION SYSTEMS HAVING REMOTE-CONTROL STATIONS OF THE REQUEST TYPE

Luigi Sarati and Maddalena Caboara, Milan, Italy, assignors to Società Italiana Telecomunicazioni Siemens S.p.A., Milan, Italy, a corporation of Italy Filed Aug. 6, 1962, Ser. No. 215,206
Claims priority, application Italy, Aug. 4, 1961, 15,306/61
8 Claims. (Cl. 340—147)

Figure 1:
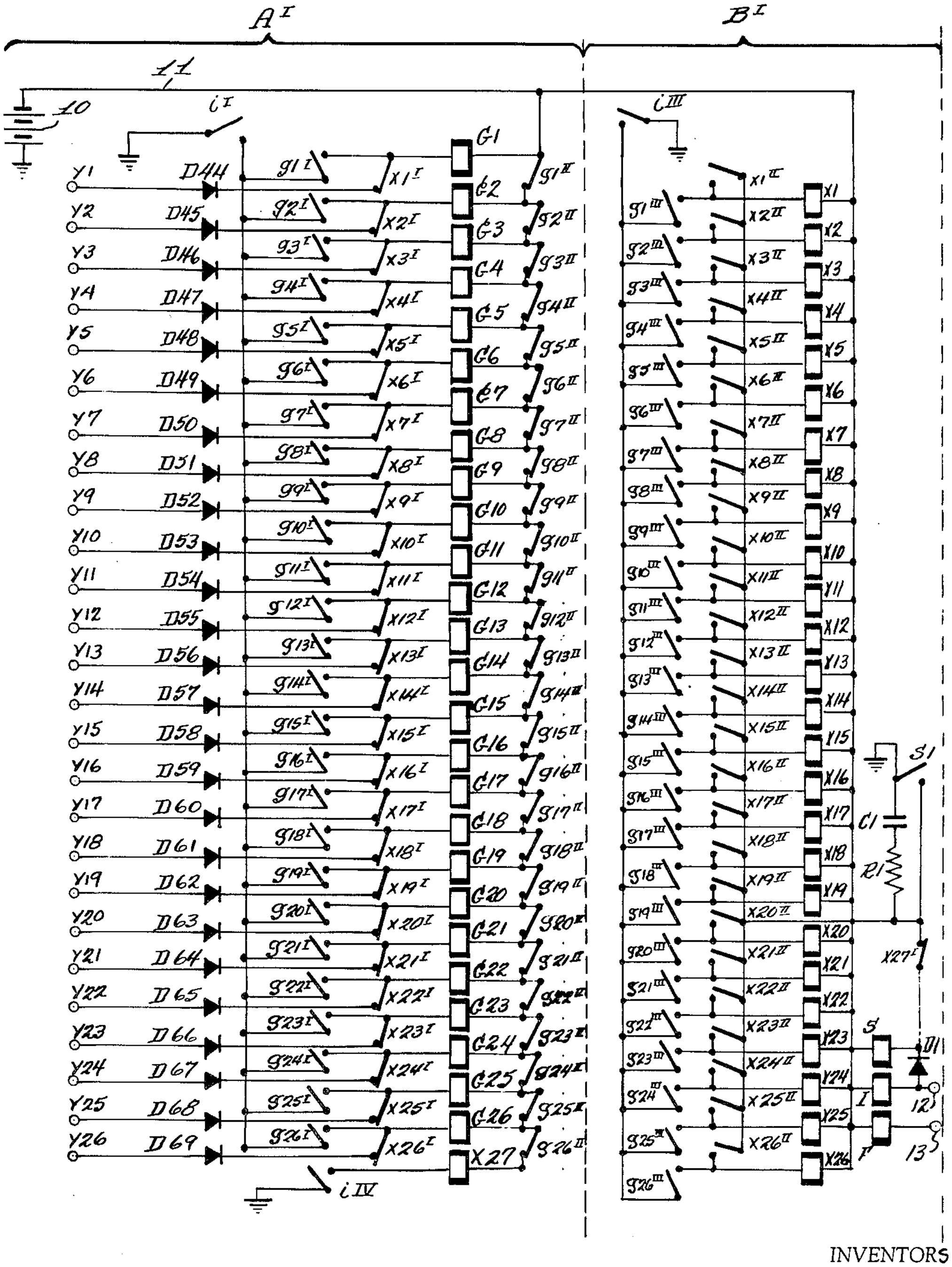

This invention relates generally to information transmission systems.

The various systems for the transmission of information which heretofore have been used are generally based upon either the code system or the pulse system. All of these systems, unfortunately involve several shortcomings which seriously restrict their utility. The code systems have the difficulty of being quite cumbersome, as well as troublesome in their operation. Pulse systems, on the other hand, always require a fixed time interval for each transmission, even where the amount of information to be transmitted is small with respect to the capacity of the transmission device.

An object of the present invention is to provide a transmission system which is capable of rapid transmission of information by means of the code system, but which nevertheless is more convenient, more practical economically, and more efficient in its operation than previously known code system transmitters.

These important advantages are realized in the improved transmission system according to the invention by the storing of every information signal during the time interval immediately preceding its transmission. This permits the use of a very limited or reduced power bias. Further economic advantages, with respect to prior systems, are achieved by the provision of a semi-conductor type coder in the transmission system according to the invention.

More specifically, this invention is directed to a process and a device by means of which information fed to a programmer is translated into instructions to be conveyed to a coder according to a sequential order, the order or program being established by search pulses. The last search pulses unblock the programmer which, for each of these pulses and for its whole duration, will transmit the information to the coder output terminals where it may be forwarded to suitable further data processing circuits.

By the term "programmer" is meant a mechanism in which information may be stored to provide for transmission of that information as instructions to another mechanism. These instructions may take the form of the stored information being released in any suitable order.

Another object of the invention is to provide a transmission system which both transmits an end-of-search signal and presets itself for information retransmission, so that an operator may request the message. It is evident that the present system must be able to receive a total number of pulses equal to the number of information signals included in the whole message plus the end-of-search signals.

In particular, the process of information transmission according to the invention consists of storing with suitable storing circuit means, the various signals or conditions to be transmitted in a sequential or progressive manner, starting from the signals representing the lowest figure. As each information signal is transmitted through the coder to the subsequent data processing circuits, a cancellation circuit erases the transmitted signal from the storage means. Thus the coder is adapted for the successive transmission of conditions present at the output of the system according to the invention, as well as for the cancellation of signals transmitted to that output. The preceding is intended only as a brief summary of several features of the invention; it being understood that the invention includes, in its scope, all of the features recited in the appended claims.

Various other objects and advantages will be apparent from the following description of one embodiment of the invention, the novelty thereof being particularly pointed out hereinafter in the claims.

Figure 1A:
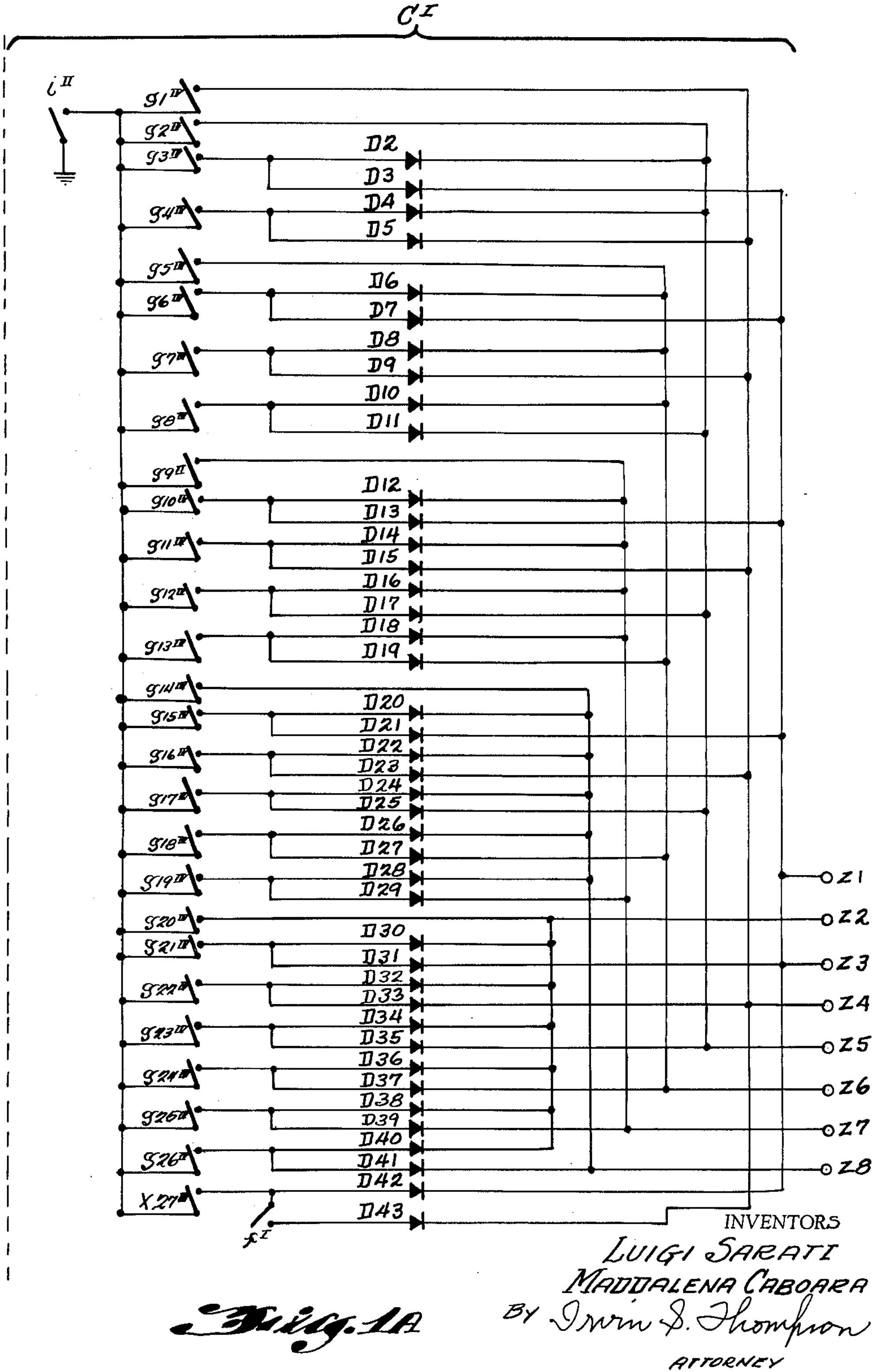

FIGURES 1 and 1A of the accompanying drawings taken together illustrate, as a non-limiting example, one practical embodiment of the transmission system in accordance with the invention. In the example shown, it is assumed that there are twenty-six information signals to be transmitted, although obviously other totals could be equally well accommodated.

The twenty-six information signals appear simultaneously, one each at the input terminals Y1 to Y26, and they are picked up at the output terminals Z1 to Z8.

A biasing battery 10 has the positive pole grounded, and the other pole thereof is connected to a bus lead 11. A voltage of 24 volts is suitable for the battery 10.

The search or request pulses are applied to a terminal 12. It should be mentioned that in the drawing all contacts are shown in their positions taken when the associated relay is de-energized; i.e., for example, contact $g3^{II}$ is normally closed, whereas contact $x3^{II}$ is normally open. A first relay I is directly connected to terminal 12, and a second relay S is connected in parallel with relay I through a diode D1.

Relay I is connected to the negative-polarity bus 11. The contacts $i^{I}$, $i^{III}$ and $i^{II}$ of relay I are located, respectively, in the programming circuits $A^{I}$, cancellation circuits $B^{I}$, and coder $C^{I}$.

The programming circuit $A^{I}$ comprises a first chain of twenty-six relays from G1 to G26, all connected in parallel with each other, and the end-of-message relay X27, also connected in parallel with the first chain. In the circuit $A^{I}$, between each relay of the chain and its preceding relay there is connected a resting contact associated with such preceding relay. For instance, the resting contact $g1^{II}$ of relay G1 is inserted between relays G1 and G2. Similar connections are provided between the other relays in this chain.

The cancellation or transfer circuit $B^{I}$ is formed by a second chain of twenty-six relays X1 to X26 connected together in parallel. Each of relays X1–X26 is disposed in a circuit which includes a working contact such as $X1^{I}$ . . . $X26^{I}$ associated with the corresponding relay of the first chain, G1–G26. Similarly, the circuit of each relay G1–G26 includes a resting contact of the corresponding relay from the second chain, X1–X26. The term "corresponding relay" refers to those which have the same index number, e.g., X1 and G1.

The coding circuit $C^{I}$ is provided with a plurality of contacts $g1^{IV}$ to $g26^{IV}$, one contact from each of the relays G1–G26 which is controlled thereby. Each of the working contacts from $g3^{IV}$ to $g26^{IV}$ in the coder closes simultaneously on two conductors, each of which is connected to a different one of outputs Z1–Z8 through a separate diode. For instance, contact $g3^{IV}$ will close the two lines which lead, respectively, through the diodes D2 and D3 to outputs Z5 and Z1. The contact $g1^{IV}$, on the contrary, closes the line connected to contacts $f^{I}$ and $x27^{II}$ in the coder $C^{I}$ through diode D43. The contact $f^{I}$ is a normally open contact closed upon energizing of a test relay F located in the cancellation circiut $B^{I}$.

The description of the invention may best be completed by a detailed consideration of the functioning of the system in transmitting an arbitrarily selected sequence of information signals. Therefore, suppose that information signals representing the integers three, fifteen and twenty-five are to be transmitted. An information signal of positive polarity which represents the number "three" will now be impressed upon the input terminal Y3, similar signals being present at Y15 and Y25. The information signals may be provided by any signal source of suitable construction or else by a measuring circuit, which are not illustrated since they form no part of this invention.

The positive signal at input Y3 excites relay G3 through the following circuit:

(1) From terminal Y3 through diode D46, closed contact $x3^{I}$, relay G3, closed contacts $g2^{II}$, $g1^{II}$, bus 11, and battery 10 to ground. The actuation of relay G3 opens its contact $g3^{II}$ to disconnect battery 10 from the other relays G4–G26 and closes its contacts $g3^{I}$, $g3^{III}$ and $g3^{IV}$. Relay G3 thus prevents the signals appearing simultaneously at inputs Y15 and Y25 from being programmed for storage on the relays G15 and G25 at this time.

The search or request operation is now performed by application of a first pulse to terminal 12 in the cancellation circuit $B^{I}$. The search pulses may be supplied by any suitable pulse source (not shown) under the control of the operator. This first search pulse excites relay I which closes its working contacts $i^{I}$, $i^{II}$ and $i^{III}$. Hence the following circuit is established:

(2) From battery 10 (negative pole thereof) through bus 11, relay X3, contact $g3^{III}$ (now closed by the previous actuation of relay G3 upon storing the integer "three"), and contact $i^{III}$ to ground. Therefore, relay X3 becomes excited and opens the contact $x3^{I}$ in programmer $A^{I}$ and closes contacts $x3^{II}$; however, relay G3 remains actuated, until the end of the first search pulse, through the following circuit in the programmer:

(3) From battery 10 through bus 11, contacts $g1^{II}$, $g2^{II}$, relay G3, contact $g3^{I}$, and contact $i^{I}$ to ground.

As a result, the information signal representing integer "three" is transmitted through coder $C^{I}$ to further processing circuits (not illustrated) in the following manner. Circuits leading to coder outputs Z5 and Z1 have been established by the recording of the information in relay G3, as follows:

(4) From the positive pole of battery 10 through contacts $i^{II}$, $g3^{IV}$ (closed by energization of G3), and diode D2 to output terminal Z5, and (5) From battery 10 (positive pole) through contacts $i^{II}$, $g3^{IV}$, and diode D3 to output terminal Z1. That is, the number "three" will appear at the output of the system in the form of signals at terminals Z5 and Z1, suitable for transmission on to any desired data processing equipment.

In the meantime, the first search pulse at 12 has excited the relay S through diode D1, closing its working contact $s^{I}$. Then at the end of the first search pulse, relay S remains excited through the circuit:

(6) From battery 10 through bus 11, relay X3, contact $x3^{II}$, normally closed contact $x27^{I}$ and contact $s^{I}$ to ground. The maintenance of relay X3 excited assures the cancelling or erasing of the number "three" from programming circuit $A^{I}$ during transmission of the remaining digits in the message.

Furthermore, at the end of the first search pulse, the relay I is de-energized and falls, which opens contact $i^{I}$ causing relay G3 of the programmer to fall. This opens contacts $g3^{I}$, $g3^{III}$ and $g3^{IV}$ and closes the resting contact $g3^{II}$ which serves to prearrange the relay G15 for excitation, in order to store the next integer in the message, the number "fifteen." Relay G15 is now actuated over the following circuit:

(7) From battery 10 through bus 11, fourteen contacts $g1^{II}$, $g2^{II}$ . . . $g13^{II}$, $g14^{III}$, relay G15, contact $x15^{I}$, and diode D58 to the input terminal Y15 impressed with the positive information signal representing the number "fifteen." The excitation of relay G15 opens the contact $g15^{II}$, inhibiting the excitation of relay G25 for the time being, and, of course, closes contacts $g15^{I}$, $g15^{III}$ and $g15^{IV}$.

Upon the arrival of the second request or search pulse at terminal 12, relay I is again energized in the same way as before, once more closing the contacts $i^{I}$, $i^{II}$, and $i^{III}$ which establishes the following circuits:

In the programmer—(8) from battery 10 through bus 11, the fourteen contacts $g1^{II}$ . . . $g14^{II}$, inclusive, relay G15, contact $g15^{I}$, and now closed contact $i^{I}$ to ground. This circuit assures the continued excitation of relay G15 during the whole searched pulse. In the coding circuit, the following circuits are closed:

(9) From battery 10 (positive pole) through contacts $i^{II}$, $g15^{IV}$, and diode D20 to output terminal Z8:

(10) From battery 10 (positive pole) through contacts $i^{II}$, $g15^{IV}$, and diode D21 to output terminal Z1. The signals now appearing at terminals Z8, Z1 indicate the transmitted number "fifteen." At the same time in the cancellation circuit there is formed:

(11) From battery 10 through bus 11, relay X15, contact $g15^{III}$, and contact $i^{III}$ to ground. This circuit actuates relay X15 which opens contact $x15^{I}$ in order to cut off relay G15 from the input at terminal Y15.

Upon termination of the second search pulse at 12, relay I is de-energized and therefore interrupts all of the preceding circuits, while relay S remains excited in the circuit:

(12) From battery 10 through bus 11, relay S, normally closed contact $x27^{I}$, and contact $s^{I}$ to ground. Thus relay S holds relay X15 excited by the circuit:

(13) From battery 10 through bus 11, relay X15, contact $x15^{II}$, and contact $s^{I}$ to ground. The information which was recorded on relay G15 is now cancelled or erased for the remainder of the current message, by the opening of contact $x15^{I}$ (contact $i^{I}$ being open again after the end of the search pulse).

The system, pre-arranged as just explained, will automatically record the last integer "twenty-five" or relay G25 during the interval immediately after the second search pulse. This takes place over the following circuit:

(14) From battery 10 through bus 11, the twenty-four contacts $g1^{II}$, $g2^{II}$ . . . $g24^{II}$, inclusive, relay G25, contact $x25^{I}$, and diode D68 to input terminal Y25 which is at a positive potential.

When the third search pulse is sent to terminal 12, relay I again closes its working contacts $i^{I}$, $i^{II}$ and $i^{III}$ to establish the following circuits. In the programmer $A^{I}$:

(15) From battery 10 through bus 11, the twenty-four contacts $g1^{II}$, $g2^{II}$ . . . $g24^{II}$, relay G25, contact $g25^{I}$, and contact $i^{I}$ to ground.

In the cancellation circuit $B^{I}$:

(16) From battery 10 through bus 11, relay X25, contact $g25^{III}$, and contact $i^{III}$ to ground.

In the coding circuit:

(17) From battery 10 (positive pole) through contacts $i^{II}$, $g25^{IV}$, and diode D38 to output terminal Z2.

(18) From battery 10 (positive pole) through contacts $i^{II}$, $g25^{IV}$, and diode D39 to terminal Z7. That is, signals are applied to terminals Z2, Z7 corresponding to the figure "twenty-five." This completes the transmission of the assumed message comprising three integers. Messages of other lengths would be handled in the same manner.

At the end of the third search pulse, relay I falls, cancelling circuits (15), (16), (17), and (18), but relay S remains excited in the previously indicated manner. The relays X3, X15 and X25, which are also maintained excited as before, assure the cancellation of the signals "three," "fifteen," and "twenty-five" from the programmer by holding open contacts $x3^{I}$, $x15^{I}$ and $x25^{I}$, respectively. During the pause following the third search pulse, in the system illustrated herein, there is no further operation. Therefore, a fourth search pulse must be applied at 12 to excite relay I again and close its contact $i^{IV}$ located in the programmer $A^{I}$ between relay X27 and ground. This excites the end-of-message relay X27 over the following circuit:

(19) From battery 10 through bus 11, the twenty-six contacts $g1^{II}$, $g2^{II}$ . . . $g26^{II}$, inclusive, relay X27, and contact $i^{IV}$ to ground. Relay X27 clearly cannot be energized until after the transmission of all information signals, because despite closing of contact $i^{IV}$ upon application of each search pulse, at least one of the contacts $g1^{II}$, $g2^{II}$ . . . $g26^{II}$, will be open so long as any information signal is recorded on the first relay chain. Relay X27 serves to open its resting contact $x27^{I}$ in circuit $B^{I}$ and to close contact $x27^{II}$ in coder $C^{I}$. The latter contact establishes the end-of-message circuit:

(20) From battery 10 (positive pole) through contacts $i^{II}$, $x27^{II}$, and diode D42 to output terminal Z1. The single signal transmitted to Z1 serves as the end-of-message signal.

Upon passage of the last search pulse (here the fourth one), contact $x27^{I}$ is opened, and relay S—which was holding "on" the relays X3, X15 and X25 in circuit $B^{I}$—falls, causing these three relays to fall also and prearranging the programmer for message re-transmission.

Whenever there are no signals at terminals Y1–Y26, this condition may be tested by sending a pulse to terminal 13 simultaneously with a pulse to terminal 12. The pulse at terminal 13 will excite test relay F, closing its working contact $f^{I}$ and establish the circuit:

(21) From battery 10 (positive pole) through contacts $i^{II}$, $x27^{II}$, $f^{I}$ and diode D43 to terminal Z4. At the same time, the circuit (20) will again be established because of the pulse at 12, giving a signal at terminal Z1. Thus, signals at Z1 and Z4 appear together, indicating that terminals Y1–Y26 have no information signals and are in condition to receive a new message.

It is to be understood that various changes in the details, components, and arrangement of parts, described herein as the preferred embodiment of the invention, may be made by those skilled in the art within the principle and scope of the invention as defined in the appended claims. The details of construction may be varied in connection with different requirements, and the system may find uses other than with remote-control stations, without departing from the scope of the invention.

We claim:

1. A system for the transmission of information, particularly for remote control stations of the request type, comprising: programming means having means for receiving a plurality of input signals, a first plurality of relay means one each associated with said plurality of input signals having contacts connected in series whereby operation of one of said relay means disconnects subsequent input signals from a power supply, a cancellation means containing a second plurality of relay means one each corresponding to said input signals having contacts connected in parallel, search means connected to said second plurality of relay means for cancelling, in order, signals introduced to and stored by said programming means, coding means in circuit with the power supply comprising plural outputs and contacts associated with said first plurality of relay means for transferring any single input signal to a different pair of said outputs and an end-of-message relay in said programming means for resetting said programming means for message retransmission.

2. A system according to claim 1 wherein said information signals are stored during the interval between request pulses and are transmitted to said output means during the request pulse following their storing interval; and wherein said cancelling means clears the stored information upon the decay of said request pulses.

3. A system for transmitting information, especially to remote control stations of the request type, comprising in combination: a programming circuit; a cancellation circuit associated with said programming circuit; and a coding circuit connected to said programming circuit; the programming circuit including a first chain of relays disposed in parallel, a plurality of inputs, one for each relay of said first chain, and a first set of contacts connecting, respectively, each input to one relay of said first chain; the cancellation circuit including a second chain of relays disposed in parallel, and a second set of contacts individually connected to respective relays of said second chain; said first set of contacts belonging to corresponding relays in said second chain and said second set of contacts belonging to corresponding relays in said first chain; and the coding circuit including a plurality of contact, each of said plurality of contacts belonging to a different one of the relays in said first chain, at least one of said plurality of contacts being connected to the coding circuit output by uniconductor means.

4. A system according to claim 3, wherein a separate resting contact is inserted between each relay of said first chain and its preceding relay in said first chain, each resting contact belonging to the corresponding preceding relay.

5. A system according to claim 3, and further comprising a request pulse input directly connected to a first relay having first, second, and third working contacts, said working contacts being inserted, respectively, in said programming circuit, in said coder circuit, and in said cancellation circuit; and a second relay connected in parallel with said first relay through a decoupling diode, inserted in a circuit provided with a resting contact of the end-of-message relay.

6. A system according to claim 3, wherein an end-of-message relay is connected in parallel to said first chain of relays, said end-of-message relay having one contact thereof inserted in said coding circuit.

7. Apparatus for sequentially transferring discrete signal inputs wherein each signal represents information of a higher or lower level in relation to other input signals to be transferred, comprising:

a source of power;

a plurality of parallel input channels, one channel for each discrete input signal;

storage means in each of said input channels and rendered connectable via its channel to said source of power upon receipt of an input signal;

each of said input channel storage means having a normally disabled blocking element connected to the next higher level channel whereby, upon activation of the lowest level channel storage means receiving a signal, said element is enabled to block the storage of input signals in all higher level channels;

a plurality of transfer channels and a like plurality of code input channels, each plurality corresponding in number to said plurality of input channels and being connectable to said source of power;

normally open circuit means connecting said source of power simultaneously to each plurality of channels responsive to receipt of an external request signal;

each of said transfer and code input channels having normally open circuit closing means therein actuatable to be closed in the respective transfer and code input channel corresponding to the input channel having an activated input storage means and in response to activation of the corresponding input channel storage means whereby a circuit interrupted by said normally open circuit means is readied between said source of power and the desired corresponding code input channel;

each of said transfer channels having normally closed circuit means connecting the storage means of each input channel to its input terminal and actuatable to be opened upon receipt of a request signal;

whereby upon receipt of a request signal closing said normally open circuit means, the activated input storage means is isolated from its input terminal but is held active via the power source;

the readied circuit between said source of power and said code input channel is closed enabling passage of current from the power source to the desired corresponding code input channel, and upon termination of the request signal, the current holding active the storage means in the active input channel is turned off, disabling said storage means and deblocking said higher level channels to thereby enable transfer of another of the input signals.

8. Apparatus according to claim 7 wherein each said storage means, circuit means, and blocking element comprises relay means.

References Cited by the Examiner

UNITED STATES PATENTS

| | | | |
|---|---|---|---|
| 2,864,075 | 12/1958 | Sandiford | 340—147 |
| 2,907,019 | 9/1959 | Merlin | 340—347 |
| 3,035,247 | 5/1962 | Sanford | 340—147 |
| 3,066,245 | 11/1962 | Baker et al. | 340—147 |

NEIL C. READ, *Primary Examiner.*